United States Patent [19]

Turudic

[11] Patent Number: 5,422,876
[45] Date of Patent: Jun. 6, 1995

[54] OUT-OF-BAND LOOPBACK CONTROL SCHEME

[75] Inventor: Andy Turudic, Defiance, Mo.

[73] Assignee: Southwestern Bell Technology Resources, Inc., St. Louis, Mo.

[21] Appl. No.: 117,932

[22] Filed: Sep. 7, 1993

[51] Int. Cl.$^6$ ............................ H04J 3/14; H04B 3/46
[52] U.S. Cl. ...................................... 370/15; 371/20.2; 371/20.5; 379/5
[58] Field of Search ............................ 370/13, 15, 17; 371/20.1, 15.1, 20.2, 20.4, 20.5; 379/5; 375/3.1, 10

[56] References Cited

U.S. PATENT DOCUMENTS

| | | | |
|---|---|---|---|
| 4,069,402 | 1/1978 | Mantovani et al. | 370/13.1 |
| 4,319,080 | 3/1982 | Kuwahara | 375/3.1 |
| 4,402,075 | 8/1983 | Bargeton et al. | 370/13.1 |
| 4,630,268 | 12/1986 | Rodenbaugh | 391/20.5 |
| 4,675,862 | 6/1987 | Banzi, Jr. et al. | 370/15 |
| 4,686,668 | 8/1987 | Koseki et al. | 390/15 |
| 4,845,735 | 7/1989 | Payne et al. | 379/5 |
| 4,860,281 | 8/1989 | Finley et al. | 379/5 |
| 4,980,887 | 12/1990 | Dively et al. | 371/20.2 |
| 5,010,544 | 4/1991 | Chang et al. | 370/13.1 |
| 5,095,482 | 3/1992 | Grallert | 371/20.5 |

FOREIGN PATENT DOCUMENTS 1128635  5/1989  Japan.
1551172  8/1979  United Kingdom.

OTHER PUBLICATIONS

English Language Abstract of Japanese Patent No. 1-128635.
Rockwell International T-1/CEPT (PCM-30) PRIMER, Document No. 29300N10, Rev. 2, Nov. 1988.2.
"Synchronous Optical Network (SONET) Transport System: Common Generic Criteria"; Bellcore TR-NW-T-000253; Issue 2; Dec. 1991.
"High-Bit-Rate Digital Subscriber Lines (HDSL)"; Draft Technical Report; T1E1.4/92-002R2; Jun. 23, 1992.

*Primary Examiner*—Douglas W. Olms
*Assistant Examiner*—Min Jung
*Attorney, Agent, or Firm*—Sandler Greenblum & Bernstein

[57] ABSTRACT

A communications method and a network for carrying out the method are provided. The network includes a loopback command system and a first link station connected to a communications link. The link traverses several loopback-capable devices as it extends from the first link station to a second link station remote from the first link station. The loopback command system controls the loopback-capable devices to cause them to loopback. In order to command a loopback of a particular loopback-capable device, the first link station generates an initial loopback value and forwards the same over the link to a downstream loopback-capable device located along the link. Each loopback-capable device receives a loopback value from an upstream device, and compares if the received value is equal to a predetermined value. If the loopback value is equal to the predetermined value, the device is placed into a loopback state. Otherwise, the loopback value is modified by the device, and the modified loopback value is forwarded to the next downstream device located along the link. The loopback value may be represented by a digital bit word, or by the position of a particular bit within a bit stream of the link.

35 Claims, 10 Drawing Sheets

OUT-OF-BAND LOOPBACK CONTROL SCHEME

FIELD OF THE INVENTION

The present invention relates to communications systems that utilize time-division-multiplexed (TDM) transmission links (e.g., T1 and PCM 30 links). More particularly, the present invention is directed to an out-of-band loopback control mechanism for a transmission link within a switched telecommunications network.

DISCUSSION OF BACKGROUND INFORMATION

Switched telecommunications networks, such as Local and Wide Area Data and Voice Networks, route transmission information (data and/or voice) over various transmission links connected to Data Terminal Equipments (DTEs). The transmission links transmit electrical signals between DTEs with transmission media such as two-wire open lines, twisted pair lines, coaxial cable, optical fibers, satellite systems, terrestrial microwave links, radial links, and so on.

Switched telecommunications networks may include public carrier networks, private carrier networks, or hybrid combinations of the same. Public carrier networks include networks intended primarily for voice communication, such as PSTN (Public Switch Telephone Network), and networks intended mainly for data communication such as PSDN (Packet-Switched Data Network) and ISDN (Integrated Services Digital Network). Private carrier networks have capabilities similar to those of public carrier networks, but are privately-owned and controlled.

Switched telecommunications networks in North America Europe and Japan utilize multiple channel transmission links, which transmit multiple channels of information in the form of a time-division-multiplexed (TDM) signal. In forming the TDM signal, sets (characters) of digital bits, with each set (character) corresponding to a respective channel of information, are interleaved in time by time-division-multiplexing (TDM); and the interleaved sets of samples are transmitted serially on a common bus which forms the multiple channel transmission link. Such multiple channel transmission links are known as primary rate carrier links. In North America and Japan, T1 primary rate carrier links are used in which 24 information channels are grouped together within each link; in Europe, PCM-30 primary rate carrier links are used in which 30 information channels are grouped together within each link. T1 and PCM-30 primary rate carrier links have aggregate bit rates of 1.544 Mbps and 2.048 Mbps, respectively.

T1 and the PCM-30 links transmit information in the form of character (byte)-interleaved serial digital bit streams, and are used to form transmission links in a switched telecommunications network. A typical switched telecommunications network includes, among several entities, a central office, a remote office, and one or more repeaters. The repeaters are disposed between the central office and the remote office, and regenerate signals passing therethrough, to thereby extend the transmission distance between the central and remote offices.

Remote testing of the transmission link, and of the repeaters and other devices placed along the link, is typically facilitated by placing a loopback mechanism within the repeaters and other devices placed along the link. The operation of a loop-back mechanism will be described more further below.

FIGS. 1–3 illustrate how TDM links such as T1 and PCM-30 links are produced, and provide a context (by way of example) in which to describe prior loopback systems and the loopback system of the present invention.

FIG. 1 illustrates a system for converting several input channels (24 channels with T1, and 30 channels with PCM-30) of channel information into a TDM signal that comprises a byte-interleaved serial digital bit stream. A plurality of coder circuits 100 are provided. Each coder circuit 100 corresponds to a particular channel of transmission information. The output of each coder circuit 100 is connected to a corresponding input of a time division multiplexer 102. Time division multiplexer 102 manipulates transmission information which is input from coder circuits 100, and provides each of a plurality of buffers 104 with a byte of data corresponding to a respective coder circuit 100. Each byte is stored in a buffer 104, and is then assigned a specific time slot within the byte-interleaved serial digital bit stream.

FIG. 2 illustrates a D4 framing structure of a T1 link. As illustrated in FIG. 2, the byte-interleaved serial digital bit stream of a T1/D4 transmission link is arranged in accordance with a framing schedule in which 24 channels 106 (each channel corresponding to a byte) are consecutively arranged in the form of a frame 108. A channel 106 is illustrated in the top portion of FIG. 2, a frame 108 is illustrated in the middle portion of FIG. 2, and a superframe 110, which includes 12 frames, is illustrated in the bottom portion of FIG. 2. The consecutively numbered bits, channels, frames and superframes of the bit stream are transmitted in time from left to right, thus resulting in a direction of transmission as indicated by the arrow at the bottom of FIG. 2.

The first through seventh bits of each channel 106 comprise transmission information, i.e., link payload information. The eighth bit (the least significant bit) of each channel 106 (called a signalling bit) is used either for supervision, or signalling (e.g. to establish a connection, or to terminate a call). The eighth bit of selected channels in every sixth and twelfth frame of superframe 110 contains signalling information. These signalling bits are inserted by "robbing" the eighth bit of each data word of each channel 106, and by replacing the "robbed" eighth bit with a signalling bit. This mechanism is referred to as "robbed bit signalling."

The 193rd bit of each frame is referred to as the multi-frame alignment bit or "F" bit. The "F" bit may comprise a bit for terminal framing, designated as Ft, or a bit for multiframe synchronization (used to identify frames 6 and 12), designated as Fs.

FIG. 3 illustrates a CEPT PCM-30 transmission framing format. The first channel 106 (which corresponds to time slot zero) and the seventeenth channel 106 (time slot sixteen) facilitate the transmission of signalling information, such as on hook and off hook, call progress, dialing digits, and so on. For "even" frames, within the sixteen frame multiframe structure (superframe 110), time slot zero is utilized to indicate a frame alignment signal (FAS). During the alternate "odd" frames of the superframe 110, time slot zero contains international bits I, national bits N (reserved for national use by respective countries), and an alarm indication signal A. Time slots 1–15 and 17–31 are assigned to 30 telephone channels numbered 1 to 30, and all eight bits of each time slot represent transmission information.

As noted above, remote testing of transmission links, and of repeaters and other devices placed along the link, is typically facilitated by providing a loopback mechanism within each of the repeaters and other devices placed along the link.

Loopback systems are commonly used for maintenance testing of T1 and PCM-30 transmission links, as well as other types of transmission links. A T1 loopback system is described in U.S. Pat. No. 5,010,544 (CHANG et al.) which utilizes an in-band technique for transmitting loopback control information. As described therein, a test unit (usually located in a central office) sends a particular code (known as a loop-up code) to a loopback mechanism, which is provided in a device placed along the link (e.g., a repeater). In response to the loop-up code, the loopback mechanism loops the communications link back on itself, so that the same test unit can send a signal out on the T1 line and measure that signal as it comes back. The test unit sends the signal along one of the two pairs of the T1 line, and the signal is then looped back along the other pair of the T1 line. The loopback mechanism is restored to its normal condition, i.e., the loopback is "dropped," by sending a loop-down code. The loop-up and the loop-down commands are sent over the tested T1 line by a test unit that has intrusive access to the line. The loopback system disclosed in U.S. Pat. No. 5,010,544 (CHANG et al.) is an in-band system, i.e., it utilizes an "in-band" T1 loopback instruction set.

In such in-band loopback systems, in-band channels, normally occupied by transmission information, are infringed upon. Accordingly, all of the transmission information is not transmitted over the link when the loopback testing is performed, and the system is not tested under real conditions. In addition, since the loopback control codes are sent in-band, the system may mistakenly be placed in a loopback state if a predetermined sequence of bits occurs randomly within the transmission (payload) information.

In some systems, transmission of the link's payload is stopped or postponed for purposes of performing a loopback. The resulting down time is obviously undesirable. In addition, as is the case with in-band loopback systems, the test is not performed under normal data transmission conditions.

Transmission links that are provided with loopback systems include a mechanism for transmitting loopback command information from a test unit to a loopback mechanism provided within a device placed along the link. There are disadvantages associated with conventional and/or prior loopback systems in that the loopback control information is transmitted in-band (i.e., within channels intended for transmission of payload information), or the transmission of payload information must be shut down during loopback, to allow the loopback control information to be transmitted.

Another feature of conventional and/or prior loopback systems is that the test unit identifies the device at which a loopback is to be performed by referring to the device's address or to a number that has been assigned to the device. Systems of this type are limited in that the system will have to be reconfigured (by, e.g., updating a data-base or inventory list) upon introduction of a new loopback-capable device along the link, so that the test unit knows the new device's number or address.

TERMS AND ACRONYMS

For purposes of clarification, and to assist readers in understanding the description given herein, a number of terms and acronyms are defined as follows:

| | |
|---|---|
| CEPT | A TDM Communications Link (equivalent to a PCM-30 link) |
| DTE | Data Terminal Equipment |
| FAS | Frame Acquisition Sequence |
| MAS | Multiframe Acquisition Sequence |
| MUX | Multiplexer |
| ODIM | Overhead Drop/Insert Multiplexer |
| PCM-30 | A CCITT TDM Primary Rate Carrier Link (w/32 channels) |
| POTS | Plain Old Telephone System |
| PSDN | Public Switched Data Network |
| PSTN | Public Switched Telephone Network |
| TDM | Time Division Multiplexing |
| T1 | A TDM Primary Rate Carrier Communications Link (w/24 channels) |

Switched Telecommunications Network

An assemblage of telecommunications stations, lines, and channels and switching arrangements for their interconnection.

Transmission Information

Transmission information is the payload information of a transmission link. Other information, such as overhead information, signalling information, and other types of "housekeeping" information, do not comprise transmission information, but are ancillary thereto.

SUMMARY OF THE INVENTION

In view of the above, the present invention, through one or more of its various aspects and/or embodiments, is thus presented to bring about one or more objects and advantages, such as those noted below.

It is an object of the present invention to provide a link with an enhanced out-of-band overhead transmission mechanism for forwarding loopback control information to devices along the link.

It is a further aspect of the present invention to provide a mechanism for forwarding the loopback control information to a particular device along the link without the need to maintain or assign addresses for loopback-capable devices placed along the link. In other words, it is an object to provide a loopback control mechanism that does not have to be reconfigured (by, e.g., updating a data-base or inventory list) upon introduction of a new loopback-capable device along the link.

It is a further object to provide an out-of-band overhead transmission mechanism which uses a minimum amount of a link's bandwidth to forward loopback control information over the link to loopback-capable devices positioned along the link.

It is yet a further object of the present invention to provide a loopback control system which does not cause erroneous or unintended switching of devices positioned along a link into a loopback mode.

The present invention, therefore, is directed to a communications method and a network for carrying out the method. A loopback command system is provided for use in the communications network. The network includes a first link station which is connected to a serial digital bit stream communications link. The link traverses several devices (including loopback-capable devices, e.g., repeaters, that comprise a loopback mechanism) as it extends from a first location, located at the first link station, to a second location. The loopback command system, when activated, causes a loopback to occur at one or more of the loopback devices placed along the link.

In accordance with a specific aspect of the invention, a mechanism is provided within the first link station for transmitting an initial loopback value over the link, and a processing device is provided within selected ones of the loopback devices placed along the link. The processing device controls processing of a received loopback value, and based on the processing, performs one or both of forwarding a processed loopback value to a next device located along the link and looping back at the device performing the processing.

The processing device may include a device for receiving a forwarded loopback value from an upstream device. The forwarded loopback value will be a modified loopback value (modified by an upstream device) if there is an upstream device that is provided with a processing device; otherwise, the forwarded loopback value will be the initial loopback value which was transmitted by the first link station. The processing device is further provided with a device for modifying the forwarded loopback value to form a modified loopback value to be transmitted to a downstream device. The processing device is also provided with a mechanism for activating a loopback of the receiving device, when the forwarded loopback value has reached a predetermined level.

In accordance with a further aspect of the present invention, the modifying device, which modifies the forwarded loopback value to form a modified loopback value, decrements the forwarded loopback value. The forwarded loopback value may be represented by a multi-bit digital word which is formed with a loopback bit transmitted over the link. The level of the forwarded loopback value is defined as a function of the magnitude of this word, and the processing device modifies the forwarded loopback value by subtracting from the word a smaller word. In accordance with a particular aspect of the invention, the smaller word is 1.

In an alternative aspect of the invention, the modifying device forms a modified loopback value by incrementing the forwarded loopback value. The forwarded loopback value may be a digital word formed with a loopback bit transmitted over the link. The level of the forwarded loopback value is defined as a function of the magnitude of the digital word, and the modifying device increments the forwarded loopback value by adding to the word a smaller word; the smaller word may be 1.

In yet a further aspect of the present invention, the above-noted bit stream comprises superframes, each superframe having several frames of channels, and each channel having several bits. One bit per frame is designated as a superframe bit, and another bit per frame is designated as a loopback bit. The superframe bit indicates the boundary of a superframe. In this regard, the network may further comprise a device for forming a word representing a loopback value with selected ones of respective loopback bits that are transmitted over several frames. A loopback bit for each frame constitutes a particular bit within the word. The first in time of the selected respective loopback bits may comprise the most significant bit of the word. In a further aspect of the present invention, the most significant bit of the word comprises a loopback bit that is transmitted immediately after the indication by the superframe bit of the boundary of a superframe.

In accordance with a particular aspect of the invention, the forwarded loopback value is represented by a loopback bit transmitted over the link, and the level of the forwarded loopback value is defined as a function of the position of the loopback bit relative to a position bit. The modifying device provided within a loopback device forms a modified loopback value, from the forwarded loopback value, by shifting the position of the loopback bit relative to the position bit.

The position bit may include a superframe pulse that corresponds to the beginning of a new superframe within the bit stream of the link. Modification of the forwarded loopback value may be performed by shifting the position of the loopback bit by one frame. The loopback activating mechanism activates a loopback of the receiving device when the position of the modified or forwarded loopback bit coincides with the position of the position bit.

The present invention is further directed to a loopback control method for use in a communications network. The communications network has a first link station connected to a serial digital bit stream communications link, and the link traverses several devices as it extends from a first location, at the first link station, to a second location. The loopback control method causes a loopback to occur at one or more of the several devices.

In the method, several steps are performed. An initial loopback value is transmitted from the first link station over the link, and a processing step is performed at selected ones of the several devices. A received loopback value is processed, and, based on the processing, a processed loopback value is forwarded to a downstream device and/or the device performing the processing is placed in a loopback state.

In performing the processing step, a forwarded loopback value is received from an upstream device. The forwarded loopback value comprises a modified loopback value when there is an upstream device that performs the processing; otherwise it comprises the initial loopback value. The forwarded loopback value is modified to form a modified loopback value to be transmitted to a downstream device. A loopback of the receiving device is activated when the forwarded loopback value has reached a predetermined level.

Further features and/or variations may be provided in addition to those noted above. For example, the invention may be directed to various combinations and subcombinations of the above-described features and/or combinations and subcombinations of several further features noted below in the detailed description.

The above-noted, and other, objects, features and advantages of the present invention will be more fully set forth hereinafter.

BRIEF DESCRIPTION OF THE DRAWINGS

The present invention is further described in the detailed description which follows, by reference to the noted plurality of drawings by way of non-limiting examples of embodiments of the present invention, in which like reference numerals represent similar parts throughout the several views of the drawings, and wherein.

DETAILED DESCRIPTION OF THE EXEMPLARY EMBODIMENTS

Figure 1:
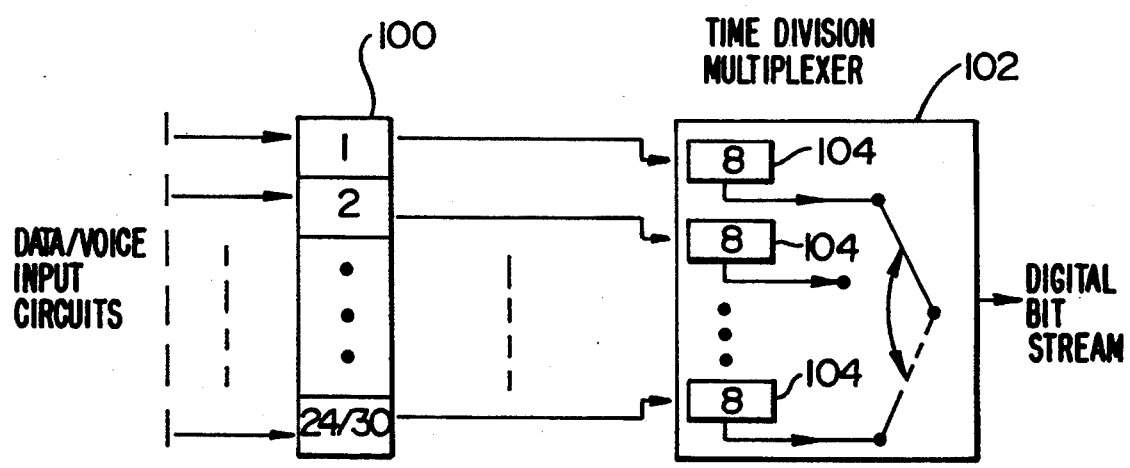
FIG. 1 illustrates a system for converting several input channels into a byte-interleaved serial digital bit stream.
Figure 2:
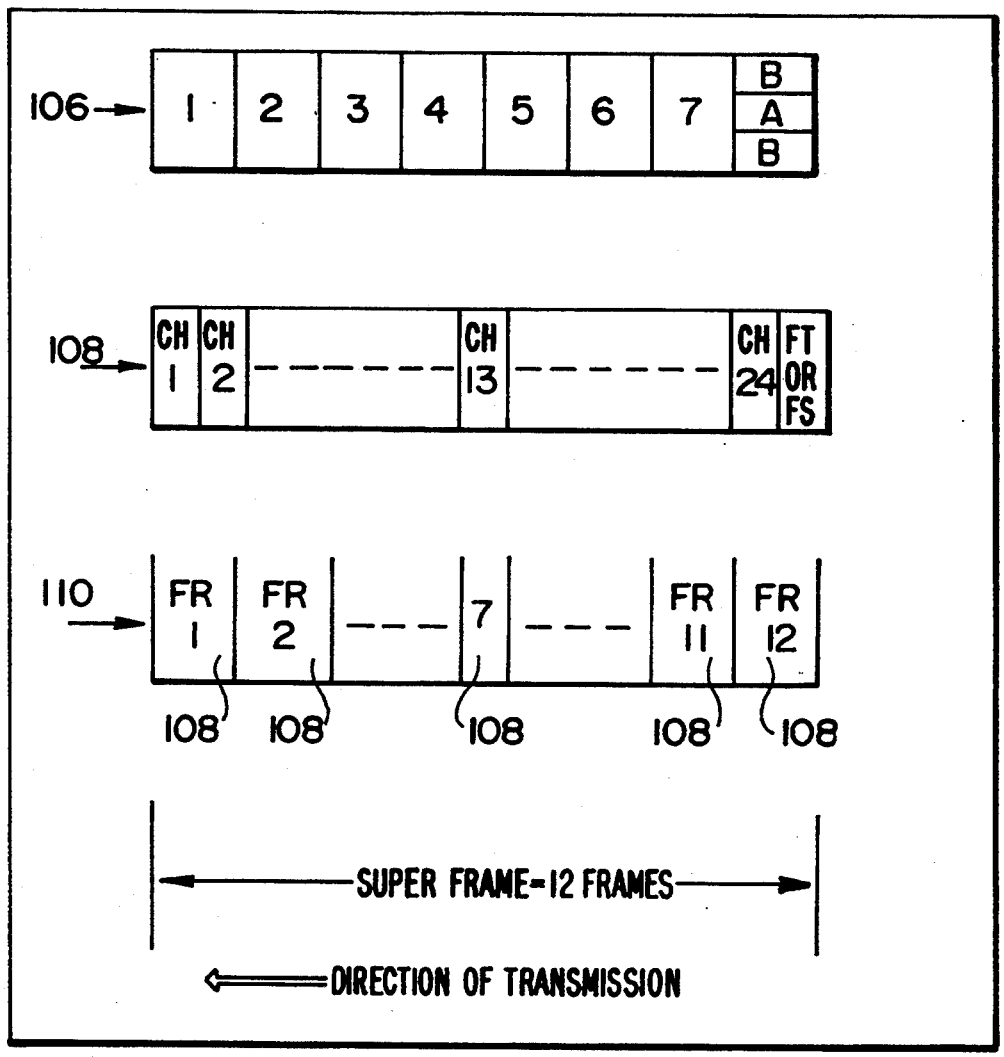
FIG. 2 illustrates a D4 framing a structure of a T1 link.
Figure 3:
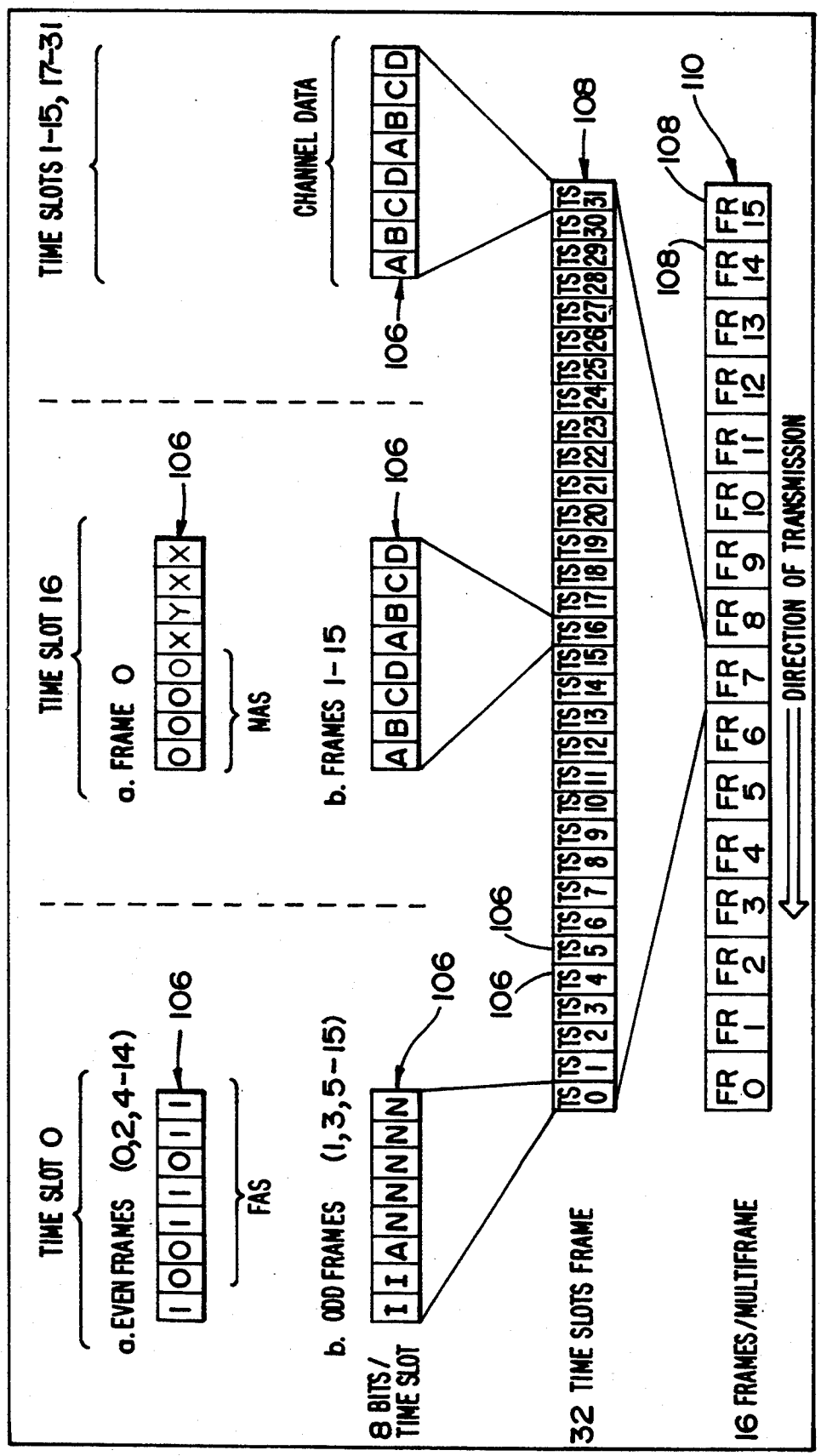
FIG. 3 illustrates a PCM-30 transmission framing format.
Figure 4:
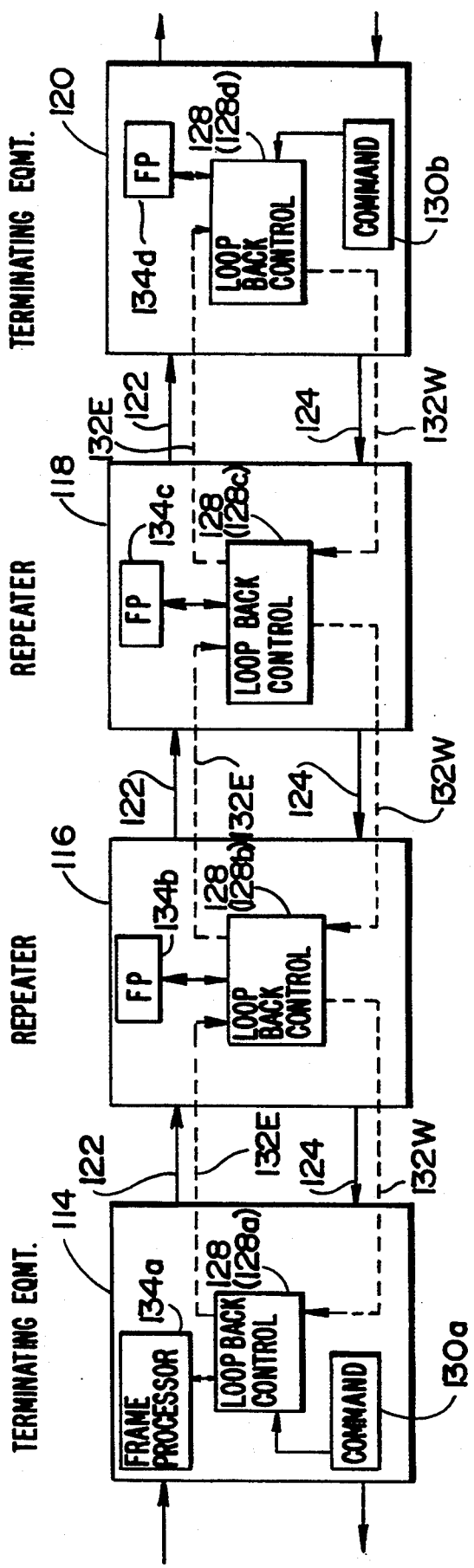
FIG. 4 illustrates an example transmission link provided in conjunction with a loopback command system of the present invention.

Referring now to the drawings in greater detail, FIG. 4 illustrates an example embodiment of a transmission link 112, which may, for example, comprise a T1 or PCM-30 link which traverses several devices, including West terminating equipment 114, a first repeater 116, a second repeater 118, and East terminating equipment 120. West terminating equipment 114 may comprise, e.g., a central office, while East terminating equipment 120 comprises, e.g., a remote office. Repeaters 116 and 118 are disposed between terminating equipments 114 and 120 in order to regenerate signals passing therethrough, to thereby extend the transmission distances between West terminating equipment 114 (a central office) and East terminating equipment 120 (a remote office).

A transmit line 122 of transmission link 112 extends from the West terminating equipment 114 to the East terminating equipment 120, and a receive line 124 of transmission link 112 extends from East terminating equipment 120 to the West terminating equipment 114.

Each of the devices placed along link 112, which comprise West terminating equipment 114, first repeater 116, second repeater 118, and East terminating equipment 120, includes a loopback mechanism which is controlled by a loopback control mechanism 128. Accordingly, each of these devices is loopback-capable, and may be referred to as a "loopback device." Each of the West and East terminating equipments 114,120 includes a loopback test unit (not shown) which includes a loopback command device 130.

When a loopback toward the West side of the link 112 is desired, loopback command device 130a of West terminating device 114 will issue a loopback command to loopback control mechanism 128a which will forward loopback information over transmit line 122 to a particular intended loopback device, and will thus instruct the intended loopback device to enter a loopback state. In operation, a loopback command is initiated at the West terminating equipment 114 via loopback command device 130a, and in response, loopback control mechanism 128a will form an initial loopback value and transmit the same over the link via transmit line 122. Each of loopback control mechanisms 128 which are provided within each of the repeaters 116, 118 and East terminating equipment 120 will then process the received loopback value, and based on the processing, perform one or both of forwarding a processed loopback value to a next loopback device along the link and looping back at that particular device which is performing the processing.

A dotted line 132E represents the route of the loopback value generated by loopback command device 130a as it is being forwarded along the Eastern direction via transmit line 122, and a dotted line 132W represents the Western route of a loopback value generated by loopback command device 130b of the East terminating equipment 120. As illustrated by the East-bound route 132E, the loopback value will be processed by each loopback device before it is transmitted to a next (i.e., downstream) loopback device. Thus, when first repeater 116 receives a loopback value, which was forwarded by an upstream device (West terminating equipment 114), the forwarded loopback value is then processed by loopback control mechanism 128b before it is then forwarded downstream along transmit line 122 to second repeater 118, for further processing within the loopback control mechanism 128c.

Each of West terminating equipment 114, first repeater 116, second repeater 118, and East terminating equipment 120 includes a frame processor 134 (a, b, c, d) which performs all processing and routing of information, so that the payload information is transported by the transmission link 112 in its intended manner, and so that any overhead functions associated with the link 112 are also appropriately processed as intended. In other words, frame processor 134 performs several "housekeeping" functions including, among other functions, the tracking and removing and/or inserting of loopback values which are being forwarded from device to device from and to the loopback control mechanisms 128 of each respective device.

The structure of frame processors 134 can be implemented in accordance with conventional technology. However, it is noted that frame processor 134 may be configured to include one or more features of the Overhead Drop/Insert Multiplexer described in a commonly assigned application filed by Andy Turudic and Samuel Sigarto on even date herewith, entitled "Out-of-Band Embedded Overhead Architecture for a Transmission Network", Attorney Docket No. P11481, the entire disclosure of which is incorporated by reference herein.

Figure 8:
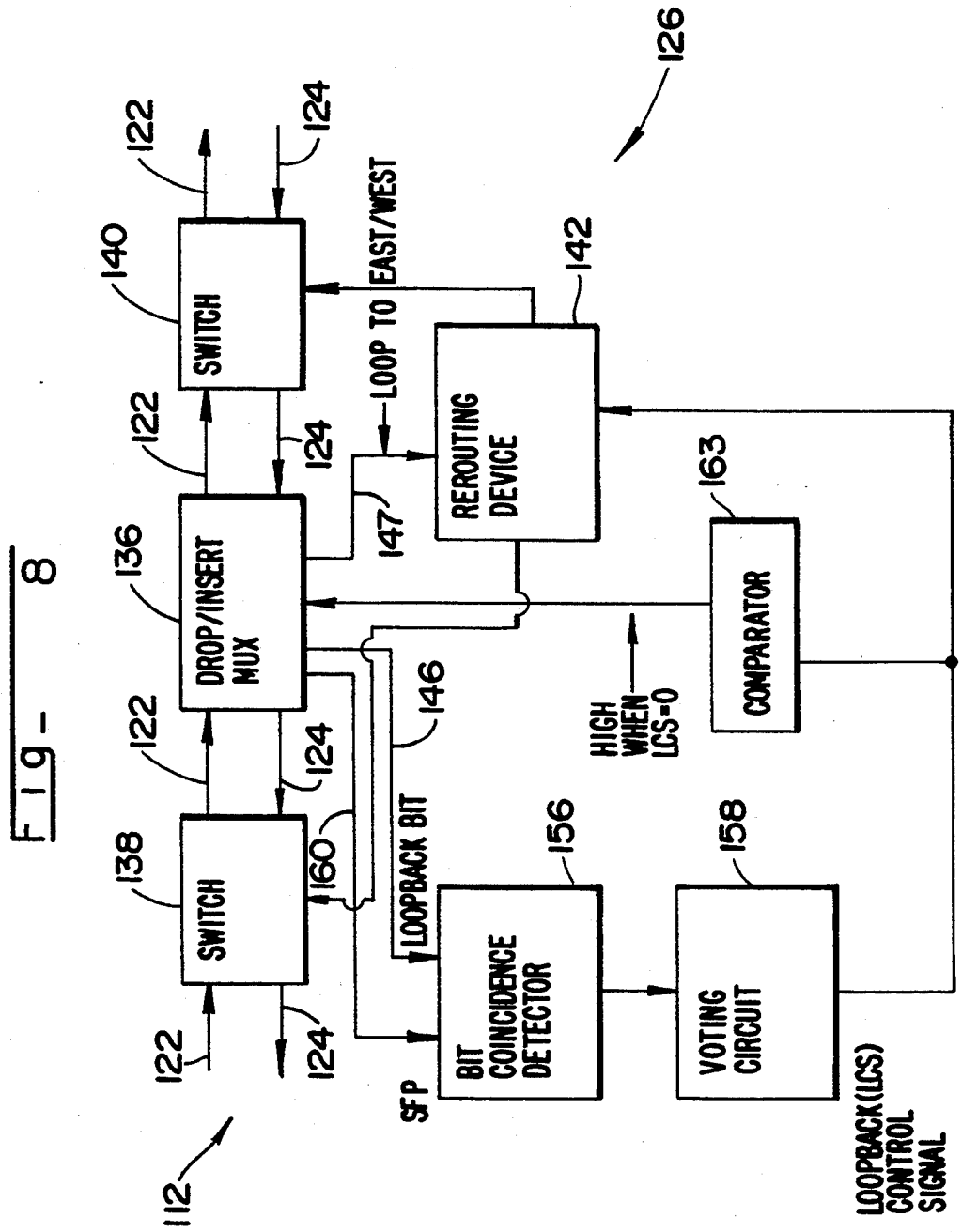
FIG. 8 illustrates a block diagram of a loopback control mechanism and loopback device provided to implement the second embodiment loopback control scheme.

Among several features disclosed in the above-noted related application is an out-of-band overhead byte. The overhead byte includes a loopback control bit, and is transported within an out-of-band channel of a TDM communications link. An Overhead Drop/Insert Multiplexer (ODIM) is also disclosed; a particular embodiment thereof is shown in FIG. 8 of the commonly assigned application. The disclosed ODIM performs two main functions: it inserts overhead information into a source link, and it drops (i.e., removes) overhead information from an object link. When the ODIM inserts overhead information, it adds channels to a source link, by, e.g., mapping a source link to a comparable link having more channels. The ODIM inserts the overhead information within the added channels.

In accordance with a first embodiment of the loopback scheme of the present invention, the loopback value which is forwarded to the respective loopback devices (e.g., repeaters 116 and 118, and terminating equipment 120) comprises a loopback command bit which is forwarded within an out-of-band overhead byte. The overhead byte may, e.g., be configured in the same manner as the path overhead byte disclosed in the commonly assigned application filed by Turudic and Sigarto on even date herewith, Attorney Docket No. P11481.

Figure 5:
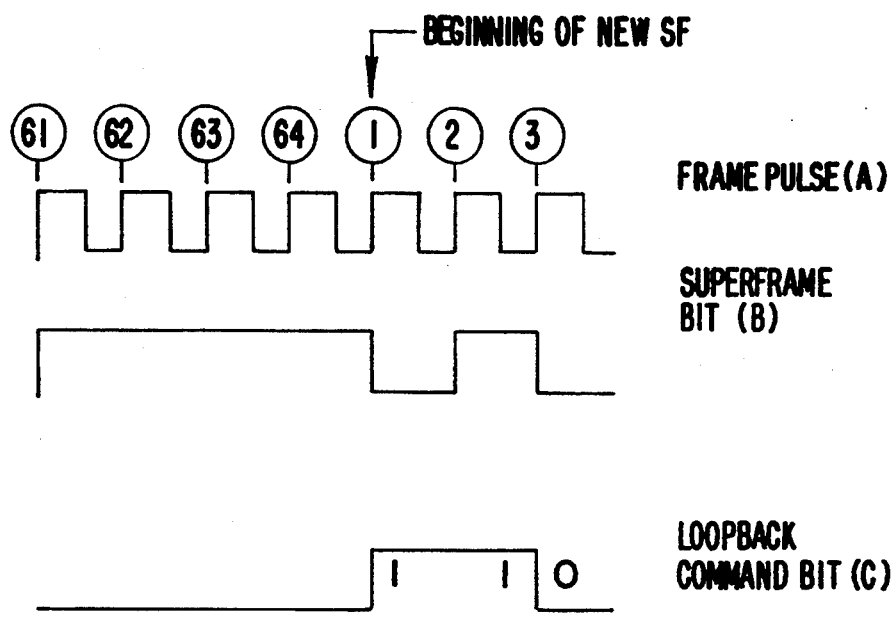
FIG. 5 is a waveform diagram that illustrates waveforms representing a frame pulse, a superframe bit, and a loopback command bit used in an example embodiment of the loopback command system of the present invention.

Referring to FIG. 5 herein, the operation of a first embodiment of a loopback control scheme will now be described. An initial loopback value is generated by a first link station. For purposes of explanation, the first link station will be West terminating equipment 114. The initial loopback value comprises a digital word having several bits, and is formed by gathering loopback command bits for several consecutive frames within a particular superframe of a TDM serial bit stream of link 112. Referring to FIG. 5, a frame pulse (a) is shown along with a superframe bit (b) and a loopback command bit (c). A first frame pulse (1) occurs at the beginning of a new superframe. The beginning of a new superframe is indicated by superframe bit (b). The system may indicate the beginning a new superframe by, e.g., keeping the superframe bit at a certain value for four consecutive cycles of the frame pulse (a). Immediately after these four consecutive frame pulses at which the superframe bit is kept at the same value, the start of a new superframe will be as indicated by the arrow which is next to the first frame pulse (1) in FIG. 5.

It is noted that superframe bit (b) may be configured to indicate the beginning of a new superframe in several different ways, without departing from the scope of the present invention. For example, the superframe bit may indicate the beginning of a new superframe when it does not change for two consecutive frame pulse cycles that immediately follow several frame pulse cycles in which the level of the superframe bit changes on each frame cycle. A superframe bit that operates in this manner is disclosed in conjunction with the information bit 6 in the application filed by Andy Turudic and Samuel Sigarto on even date herewith, Attorney Docket No. P11481.

In order to form the digital bit word which represents the loopback value, the loopback bits transmitted with each consecutive frame starting with the first frame (1) are gathered. The loopback bit waveform (c) illustrated in FIG. 5 is simplified to represent a loopback value digital bit word equal to 6. The most significant bit of the word is "1" and occurs right at the beginning of the new superframe. The second significant bit is "1", and the least significant bit "0". Accordingly, in FIG. 5, the loopback value which is forwarded to the respective loopback devices along the link 112 is formed with a three bit word. The range of the values that may be indicated by a three bit word is relatively small; thus, the length of the loopback value word will preferably be greater than 3 bits, e.g., on the order of between 6 and 8 bits. However, for purposes of illustration, the loopback value word illustrated in FIG. 5 is simplified to only include 3 bits.

The loopback control scheme will operate as follows, in response to an initial loopback value which is forwarded by the first link station (e.g., West terminating equipment 114). Upon generation and forwarding of an initial loopback value, each downstream device will determine if the loopback value forwarded to it has reached a predetermined magnitude or level. If the loopback value forwarded to the device has not reached the predetermined level, the device will then modify (i.e., decrement) the value, and will forward a processed loopback value to the next downstream device. This process continues until a device determines that the loopback value reaches a predetermined level (e.g., 0). Once this occurs, the device making the determination will enter a loopback state. Accordingly, Referring to link 112 illustrated in FIG. 4, if an initial loopback value of 6 is forwarded by West terminating equipment 114, no loopback will occur, since the respective loopback devices, which include first repeater 116, second repeater 118, and East terminating equipment 120, will only decrement the loopback value of 6 a total of 3 times, thus making the resulting value 3 when it reaches East terminating equipment 120. This illustrates that the loopback system can be placed in an "off" state by setting the initial loopback value to a sufficiently high value, thereby preventing the devices from being placed in a loopback condition.

If, however, West terminating equipment 114 forwards an initial loopback value of 2, this value will be forwarded to first repeater 116 and decremented to be "1", and the value "1" will be forwarded to the next repeater 118 which will be decremented to get a value of "0". The "0" will be forwarded to East terminating equipment 120, which will then determine that the forwarded loopback value is equal to "0", and will thus place itself, by means of loopback control mechanism 128d, into a loopback state.

The maximum depth of the link, i.e., the maximum number of devices that the loopback system can effectively independently control the loopback of, is a function of the number of bits used to form the loopback value. a loopback command word having only 3 bits can control a maximum of 8 separate loopback devices placed along a particular link.

It is noted that the above-described process is only a representative example embodiment of the present invention. Several variations can be made in the above-described process. For example, the devices along the link can modify the loopback values before determining whether the value has reached the predetermined level. In addition, rather than decrementing the value when modifying it, the device can modify the value by incrementing the value.

Figure 6:
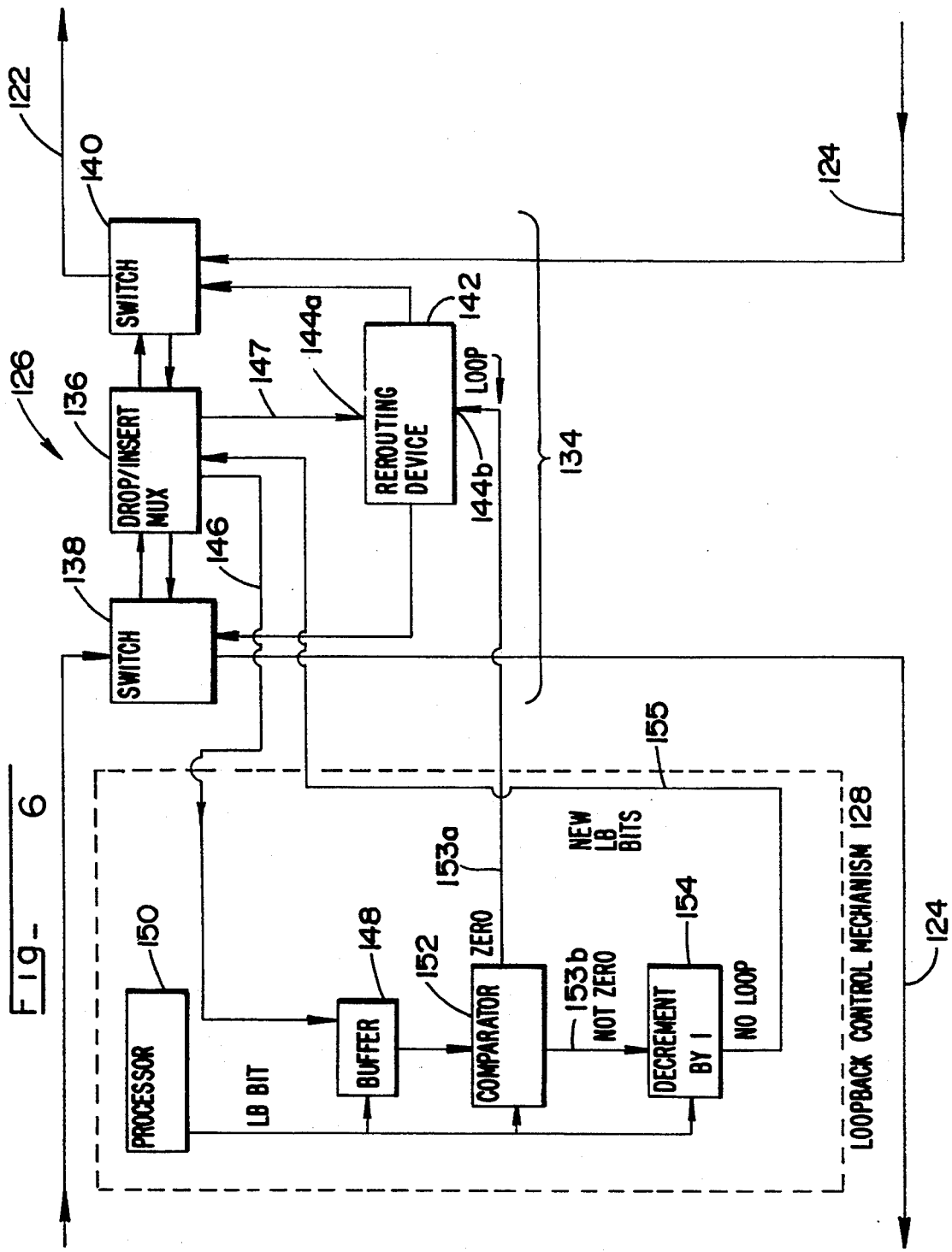
FIG. 6 illustrates a more detailed block diagram of a first embodiment loopback control mechanism provided within a loopback-capable device.

FIG. 6 illustrates a block diagram of a loopback device 126 capable of performing the above-described first embodiment loopback control scheme. The device 126 includes a loopback control mechanism 128 connected to transmission monitoring and routing control devices 134. Device 126 may be one of several types of loopback-capable devices which are typically provided along the path of a communications link. For example, device 126 might comprise a repeater device, a central office, or a remote office of a communications network. These devices comprise several components other than those illustrated in FIG. 6, which has been simplified for purposes of the present description.

Transmission monitoring and routing control devices 134 comprise a Drop/Insert Multiplexer 136, a West side switch 138, an East side switch 140, and a rerouting device 142. West side switch 138 is connected to Western sections of the transmit and receive lines 122,124, and is also connected to a Western side of Drop/Insert Multiplexer 136. East side switch 140 is connected to Eastern sections of the transmit and receive lines 122, 124, and is also connected to an Eastern side of Drop/Insert Multiplexer 136. In a normal or default operation, switches 138 and 140 will direct (i.e., route) East bound link information from the Western section of transmit line 122 through Drop/Insert Multiplexer 136 to the Eastern section of transmit line 122. Similarly, in a default operation, switches 138 and 140 will direct (i.e., route) West bound link information from the Eastern section of receive line 124 through Drop/Insert Multiplexer 136 to the Western section of receive line 124.

Rerouting device 142 is connected to Drop/Insert Multiplexer 136, to receive rerouting information therefrom, and is connected to each of West side switch 138 and East side switch 140, to facilitate the control of each of the switches. Rerouting device 142 has a first input 144a which receives the East/West indication output line 147. In addition, rerouting device 142 has an second input 144b connected to a loopback control output of loopback control mechanism 128.

Drop/Insert Multiplexer 136 performs several functions, including removing the loopback bit from an overhead byte present within the transmission link's serial bit stream, and outputting the same to loopback bit output line 146. In addition, Drop/Insert Multiplexer 136 provides an indication to rerouting device 142, via East/West indication output line 147, of whether or not a particular loopback control signal (loopback value) is being forwarded by a device coming from the East side of the loopback device 126, or from the West side of the loopback device 126, so that rerouting device 142 can modify its operation accordingly.

As illustrated in FIG. 6, loopback control mechanism 128 comprises a processor 150, a buffer 148, a comparator device 152, and a decrementing device 154. Processor 150 is connected to each of buffer 148, comparator 152, and a decrementing device 154, and controls the operation of each of those devices. Buffer 148 is connected to loopback bit output line 146, and is also connected directly to comparator 152. Comparator 152 comprises a first output line 153a, and a second output line 153b. Second output line 153b is connected to an input of a decrementing device 154. Decrementing device 154 is connected, at an output thereof, via line 155 to an input of Drop/Insert Multiplexer 136.

Buffer 148 receives loopback bits, starting with the first loopback bit that is forwarded immediately after the start of a new superframe as indicated by a superframe bit. Drop/Insert Multiplexer 136 will monitor the occurrence of a superframe bit, and will accordingly start forwarding the loopback bits to loopback control mechanism 128 upon occurrence of the superframe bit. Processor 150 will monitor the activity of buffer 148, and will keep track of when, for example, an elapse of time has occurred between the last loopback bit and the present loopback bit that has been forwarded from Drop/Insert Multiplexer 136. If a significant time has elapsed since the last loopback bit has been forwarded, processor 150 will accordingly control devices 148, 152, and 154 of loopback control mechanism so that the devices operate under the assumption that the next immediately transmitted loopback bit will be the first bit, i.e., the most significant bit, of a loopback value being forwarded by a test unit over the transmission link.

When the first, i.e., most significant, loopback bit is forwarded over line 146, buffer 148 stores the same, and begins to gather subsequently forwarded bits (on a per-frame basis) until a complete loopback value word is formed within buffer 148. Once this occurs, the loopback value word is forwarded to comparator 152, which compares the value to determine if it is equal to a predetermined value (e.g., 0). If the value being transmitted is 0, an indication is forwarded by comparator 152 over a first output line 153a to activate rerouting device 142, which will cause the appropriate switch to cause a loopback. If the initial loopback value was forwarded by West terminating equipment 114 (FIG. 4), rerouting device 142 will be alerted to this fact, via East/West indication line 147, and will thus instruct West side switch 138 to cause the transmission link to loopback on itself in the Western direction; that is, the Western section of transmit line 122 will be directly connected via West side switch 138 to the Western section of receive line 124, so that all information is routed back toward West terminating equipment 114.

If comparator 152 determines that the loopback value is not 0, the word is forwarded to decrementing device 154 via second output 153b, and the word is decremented by subtracting a smaller word, e.g., equal to 1. In this case, no loopback will be performed, and the decremented word will be forwarded back in the form of new loopback bits to Drop/Insert Multiplexer 136 via output line 155. Drop/Insert Multiplexer 136 will place the new loopback bits in the overhead bytes of the link's bit stream subsequent to the start of the next superframe as indicated by the superframe pulse. Drop/Insert Multiplexer 136 will accordingly monitor for the occurrence of a next superframe pulse, and appropriately insert the new loopback bits in the respective overhead bytes, for transmission to the next downstream loopback device, for subsequent processing by that device in a similar manner to that just described above with respect to the device illustrated in FIG. 6.

Figure 7:
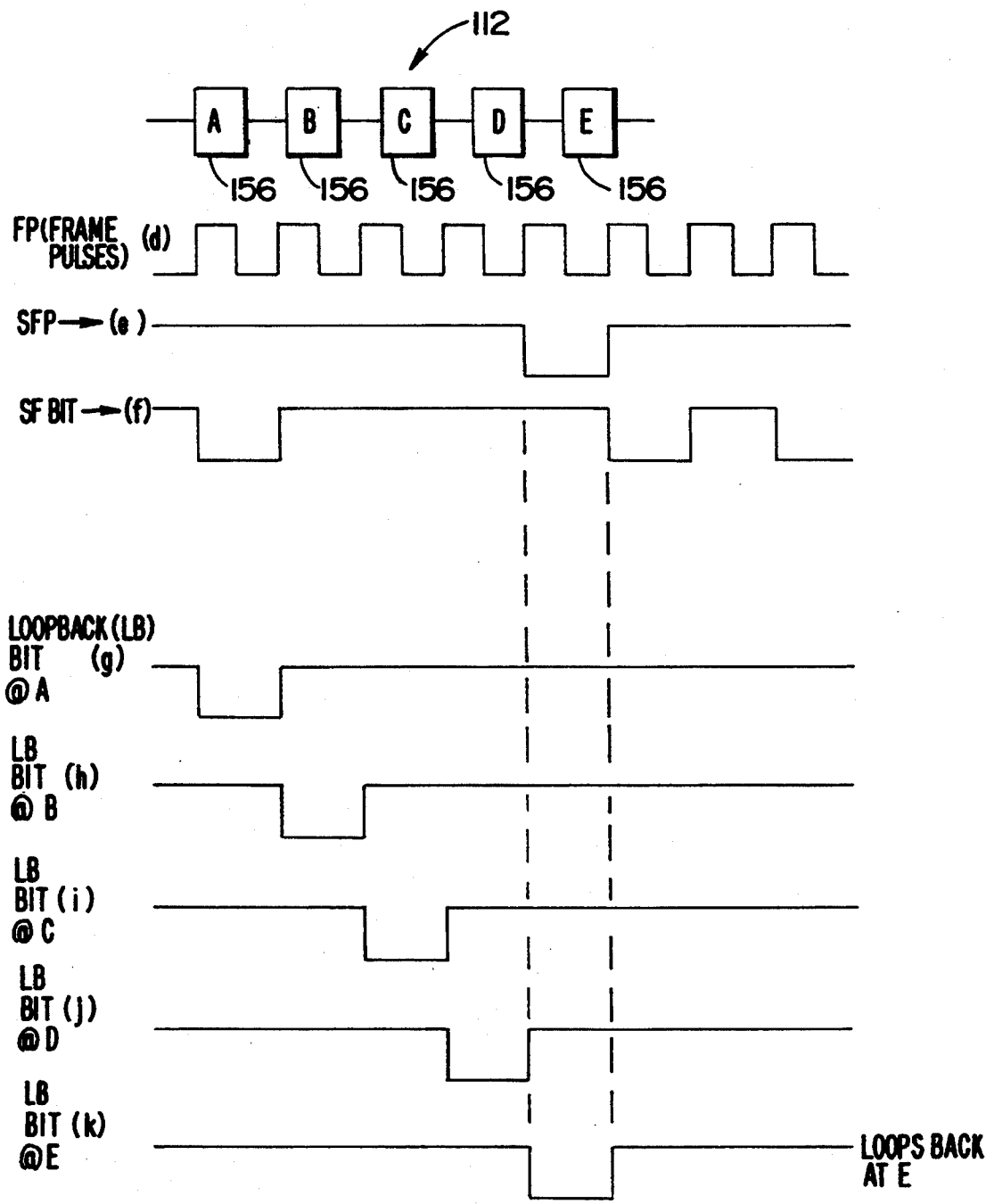
FIG. 7 is a waveform diagram that illustrates, by reference to a superframe pulse, a superframe bit, and a loopback bit, the operation of a second embodiment loopback control scheme of the present invention.

FIGS. 7-9 are directed to a second embodiment out-of-band loopback control scheme of the present invention. FIG. 7 illustrates a frame pulse waveform (d), aligned with a superframe pulse waveform (e), a superframe bit waveform (f), and several versions of a loopback bit waveform (g)-(k). As described above with respect to the first embodiment of the present invention, a forwarded loopback value is monitored by a loopback control mechanism provided within each loopback device which is placed along the transmission link. In effect, the forwarded loopback value is processed to form a processed loopback value for subsequent forwarding to the next loopback device located downstream on the transmission link.

Each loopback device will look at the processed loopback value and make a determination of what that value is. If the value has reached a certain level, the device will loopback upon itself, i.e., it will go into a loopback state. In accordance with the first embodiment, as described above, the loopback value is changed as it reaches each loopback device, by, e.g., decrementing the value. In the alternative, the first embodiment may be modified so that the loopback value is incremented rather than decremented when it gets to each loopback device. When the loopback value reaches a predetermined value, such as 1 or 0, the device will be put into a loopback state.

The second embodiment does not decrement or increment a loopback value, which is represented in the form of a digital bit word, but rather defines the level of the forwarded loopback value as a function of the position of the loopback bit relative to a position bit.

In the waveform diagrams illustrated in FIG. 7, the position bit is represented by the superframe bit waveform (f). The position of a loopback bit within a string of frames of a link bit stream indicates the effective loopback value for purposes of defining the device at which a loopback is to be performed. The initial loopback value is defined by the test unit, e.g., West terminating equipment 114, by placing the loopback bit within a particular frame. Each loopback device placed along the link will then check if the loopback bit coincides with the frame of the superframe starting pulse. It if does, the device is placed in a loopback state. Otherwise, the loopback bit is delayed by a frame and forwarded to the next downstream device.

In FIG. 7, several loopback devices 156 are illustrated for reference purposes in the following description. When a loopback bit reaches a first loopback device A along transmission link 112, the loopback device A will determine whether the loopback bit coincides with the superframe pulse. If the loopback bit does not coincide with the superframe pulse, which is the case as shown in FIG. 7, loopback device A will delay the loopback bit by one frame so that the loopback bit will reach the next loopback device B positioned to coincide with the next frame pulse as indicated in waveform (h). Loopback device B will then make a comparison to see if the loopback bit coincides with the superframe pulse (e). Device B will determine that loopback bit (h) does not coincide with superframe pulse (e), and will again delay the loopback bit by one additional frame so that it appears as shown in waveform (i). The loopback bit will be forwarded to loopback device C, and loopback device C will again make the same determination, and upon determining that the loopback bit (i) does not coincide with the superframe pulse (e), will again delay the position of the loopback bit by an additional frame.

The fourth loopback device D will again perform the same process, resulting in a loopback bit being delayed to the point at which it coincides with the superframe pulse (e) when it reaches device E. The loopback bit will be as represented by waveform (k) when this happens. The fifth loopback device E will then determine that the loopback bit coincides with the superframe pulse (e), and will thus enter a loopback state.

In order to prevent or minimize an erroneous switching of a loopback device into a loopback state, the loopback devices are configured so that they will wait until a detection is made that the loopback bit coincides with the superframe pulse for N (e.g. 16) consecutive superframes. Upon determining that the loopback bit coincides with the superframe pulse for N consecutive superframes, the loopback device will then place itself into the loopback state. Similarly, in taking a loopback device out of the loopback state, the loopback device will wait until the loopback bit does not coincide with the superframe pulse for N consecutive superframes, and in response will exit the loopback state.

Using this scheme, the number of devices that can be chained within a particular transmission link, and that can have loopback capabilities, will be determined by the number of frames within a particular superframe. Thus, e.g., if there are 64 frames within a superframe, a maximum number of 64 loopback-capable devices may be placed along the link, and controlled by this delay scheme.

FIG. 8 illustrates a particular loopback device 126 for implementing the second embodiment loopback control scheme. Loopback device 126 comprises a West side switch 138 connected to a Drop/Insert Multiplexer 136 and an East side switch 140. Each of switch 128, MUX 136, and switch 140 are connected in cascade and are placed within the respective paths of transmit line 122 and receive line 124 of transmission link 112. Loopback device 126 further comprises a rerouting device 142, a bit coincidence detector 156, a voting device 158, and a comparator 163. Drop/Insert Multiplexer 136 is connected to each of rerouting device 142, bit coincidence detector 156, and comparator 163.

An East/West indication output line 147 extends between Drop/Insert Multiplexer 136 and an appropriate input of rerouting device 142, for allowing Drop/Insert Multiplexer 136 to notify rerouting device 142 that a loopback should be performed toward the West or toward the East side of the link. This may be performed by Drop/Insert Multiplexer 136 by determining where a forwarded loopback value is received from, i.e., whether it is received via transmit line 122 or via receive line 124 of transmission link 112. If the loopback value is received by transmit line 122, Drop/Insert Multiplexer 136 will indicate (by signalling over line 147) that a loopback should be performed toward the West side of the transmission link. Similarly, if a loopback value is sent via receive line 124, Drop/Insert Multiplexer 136 will indicate that a loopback, when commanded, is to be performed toward the East side of the transmission link 112.

A loopback bit output line 146 extends from Drop/Insert Multiplexer 136 to bit coincidence detector 156. Drop/Insert Multiplexer 136 will remove a loopback bit from the particular overhead out-of-band overhead byte of the link, and place the same on the loopback bit output line 146, for input into bit coincidence detector 156. In addition, Drop/Insert Multiplexer 136 will produce a superframe pulse upon detection of the beginning of a superframe based upon the superframe bit which is also present in the overhead byte transmitted along transmission link 112. A superframe pulse is outputted via superframe pulse output line 160, and is forwarded to bit coincidence detector 156 in a similar manner as a loopback bit is forwarded over loopback bit output line 146.

Each of the devices illustrated in FIG. 8 will be timed according to conventional means used in the technology of telephony transmission links, such as T1 and PCM-30 links. Accordingly, detailed features such as the production and forwarding of frame pulse signals to each of the devices, in order to effect timing of the same, are not illustrated in detail in the block diagram of FIG. 8. However, it is noted that such timing signals should be provided to the devices as needed.

Bit coincidence detector 156 determines when the superframe pulse and loopback bit coincide. Voting device 158 performs a "voting" operation, and determines whether the two signals coincide for a total of N consecutive superframes of the transmission link. One suggested example value for N is 16. Voting device 158 outputs a loopback control signal (LCS) based on this determination. When voting device 158 determines that the signals coincide for N Consecutive superframes, the loopback control signal (LCS) will be set to 1. Otherwise, the LCS will be 0, indicating that no loopback is to be performed. When LCS=0, a high signal is output by comparator 163 to Drop/Insert Multiplexer 136.

When the signal output by comparator 163 is high, Drop/Insert Multiplexer 136 will delay the position of the loopback bit by one frame within the superframe of the link's bit stream.

When the LCS signal is not equal to 0, but rather is set to 1, rerouting device 142 will respond by activating the appropriate switch (either West side switch 138 or East side switch 140) to cause the loopback device to enter its intended loopback state.

Figure 9A:
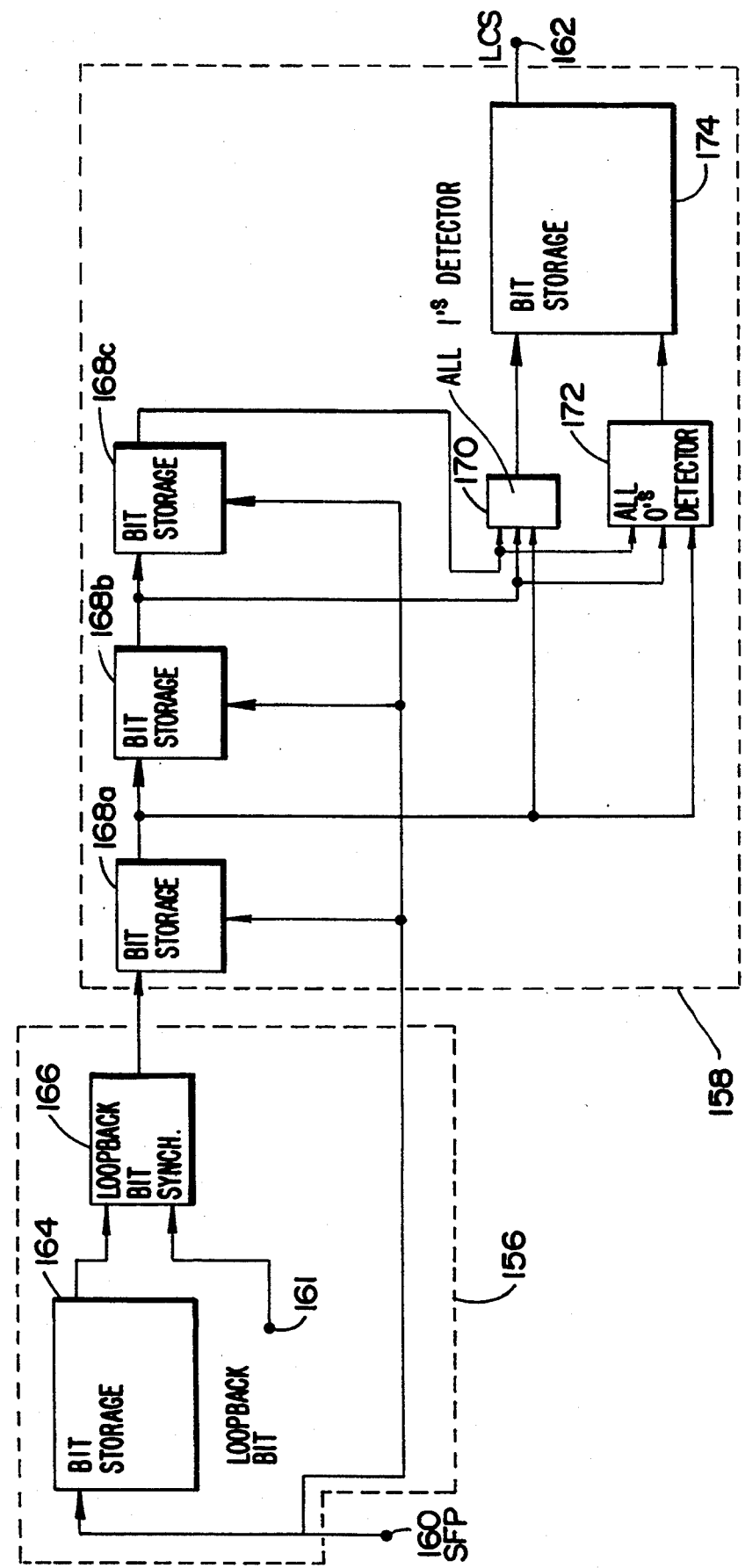
FIG. 9A illustrates a simplified exemplary functional block diagram for implementing the coincidence detector and voting device of the loopback control mechanism of FIG. 8.

FIG. 9A illustrates an illustrative but non-limiting example functional block diagram of means for performing the coincidence detection and voting functions described above. The means illustrated in FIG. 9A determine when the superframe pulse and the loopback bit coincide, and further determine whether such coincidence occurs for N consecutive superframes of the link's data stream. The means illustrated in FIG. 9 include bit coincidence detector 156 and voting device 158 each connected to each other. Bit coincidence detector 156 has two inputs: a superframe pulse input 160 and a loopback bit input 161. Voting device 158 includes one output, which is the loopback control signal (LCS) output 162.

Bit coincidence detector 156 comprises a bit storage 164, which is connected to one input of a loopback bit synchronizer. Loopback bit input 161 is connected to the other input terminal of synchronizer 166. The output of synchronizer 166 is connected to an input of bit storage devices 168.

Superframe pulse input 160 is connected to an input of bit storage circuit 164, and is also connected to the clock inputs of each of bit storage devices 168a, 168b and 168c. The outputs of each of the three bit storage devices are connected to respective inputs of an all 1's detector 170, and are also connected to respective inputs of an all 0's detector 172. The output of detector 170 is forwarded to a bit storage device 174. The output of all 0's detector 172 is connected to a reset input of bit storage device 174. The output terminal of bit storage device 174 comprises loopback command signal (LCS) output terminal 162.

For purposes of simplifying FIG. 9A, voting device 158 is configured so that N equals 3. Thus, the illustrated voting device will determine whether or not the loopback bit coincides with the superframe pulse for a total of 3 superframes. If that occurs, the respective outputs of the three bit storage devices 168a, 168b and 168c, will forward a "1" to each input of all 1's detector 170, and thus will place a "1" in bit storage 174, which will cause LCS output 162 to be set to a high state. When the LCS output is set, that indicates that a loopback is to be performed.

When the loopback state is to be deactivated, voting device 158 will determine when the superframe pulse does not coincide with the loopback bit for N superframes. This will cause each of the cascaded bit storage devices to be reset, which will cause all the inputs to all 0's detector 172 to be 0. This will cause the output of all 0's detector 172 to be set, which will cause bit storage device 174 to be reset, thus causing LCS output terminal 162 to be reset to a low state. A low state LCS indicates that the loopback state is to be deactivated.

Coincidence detector 156 and voting device 158 may be implemented, for example, by performing the functions illustrated in FIG. 9A. These functions may be implemented with software and/or hardware. Although the inventor presently contemplates implementing the devices illustrated in FIG. 9A by software, one possible hardware implementation of bit storage devices 164, 168, and 174, loopback bit synchronizer 166, all 1's detector 170, and all 0's detector 172 may comprise an appropriate combination of logic devices.

Figure 9B:
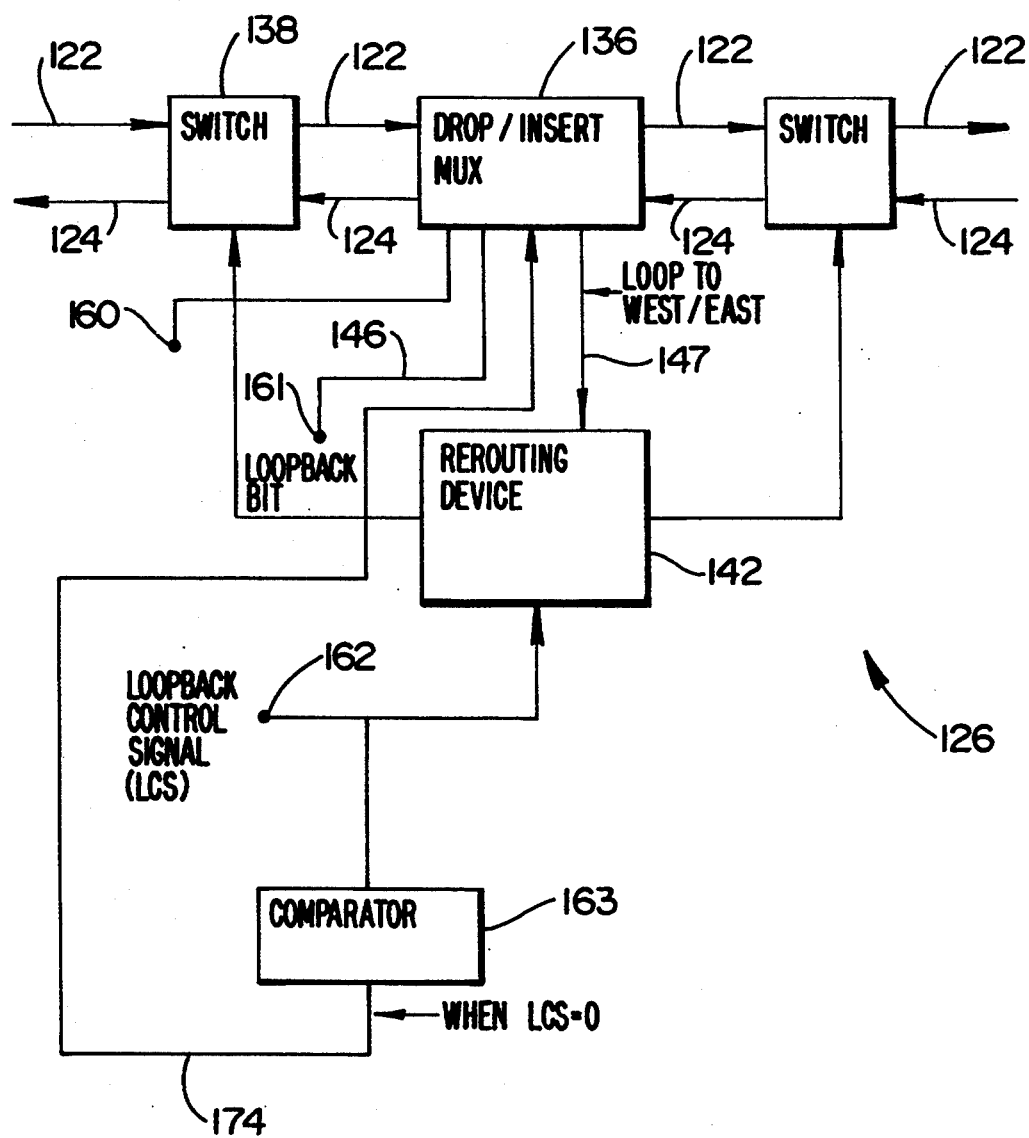
FIG. 9B illustrates a block diagram of a loopback device for connection to the circuit illustrated in FIG. 9A.

FIG. 9B illustrates the respective devices of a loopback device which are coupled to coincidence detector 156 and voting device 158 illustrated in FIG. 9A. All the devices illustrated in block form in FIG. 9B having like reference numerals to those of the devices in FIG. 8 are, for purposes of the present description, identical to those illustrated in FIG. 8.

With reference to FIG. 9B, the operation of coincidence detector 156 and voting device 158 will now be further described. When a high value, i.e., a "1," is output at LCS terminal 162, rerouting device 142 will activate the intended switch, which will be either West side switch 138 or East side switch 140 depending on where the loopback request came from. This will be determined by Drop/Insert Multiplexer 136, and will be indicated to rerouting device 142 via East/West indication output line 147.

When the LCS is equal to 0, this indicates that the loopback state is to be deactivated, if it is presently in a loopback state. When the LCS is 0, that signal is forwarded by comparator 163 to Drop/Insert Multiplexer 136 via no-loop line 174, which will cause the loopback bit to be delayed by a frame when it is transmitted to the next loopback device which is placed downstream along the link. In addition, when the LCS is equal to 0, if the loopback device is presently in a loopback state, rerouting device 142 will cause West switch 138 and/or East switch 140 to be deactivated, so that the default route of transmit line 122 is reestablished, and/or so that the default route of receive line 124 is reestablished.

While the invention has been described with reference to several noted embodiments, it is understood that the words which have been used herein are words of description, rather than words of limitation. Changes may be made within the purview of the appended claims, without departing from the scope and spirit of the invention in its aspect. Although the invention has been described herein in reference to particular means, materials, and/or embodiments, it is understood that the invention is not to be limited to the particulars disclosed herein, and that the invention extends to all equivalent structures, methods and uses, such as are within the scope of the appended claims.

For example, the various devices depicted in the several Figures may be implemented with individual hardware components, with a software-controlled general purpose processor, or with any combination of off-the-shelf and/or custom-developed hardware, circuitry, and/or software, without departing from the scope of the present invention.

What is claimed is:

1. A loopback command system for use in a communications network, the communications network having a first link station connected to a serial digital bit stream communications link, wherein the link traverses several devices as it extends from a first location, at the first link station, to a second location, and further wherein the loopback command system causes a loopback to occur at one or more of the several devices, said loopback command system comprising:

means provided within said first link station for transmitting an initial loopback value over said link; and processing means provided within selected ones of said several devices for processing a received loopback value, and, based on the processing, performing one or both of forwarding a processed loopback value to a downstream device and looping back at the device performing the processing, said processing means further comprising:

means for receiving a forwarded loopback value from an upstream device, said forwarded loopback value comprising a modified loopback value if there is an upstream device that is provided with said processing means, said forwarded loopback value otherwise comprising said initial loopback value;

means for modifying said forwarded loopback value to form a modified loopback value to be transmitted to a next device along said link; and means for activating a loopback of the receiving device when said forwarded loopback value reaches a predetermined level.

2. The loopback command system according to claim 1, wherein said modifying means, which modifies said forwarded loopback value to form a modified loopback value, comprises means for decrementing said forwarded loopback value.

3. The loopback command system according to claim 1, wherein said modifying means, which modifies said forwarded loopback value to form a modified loopback value, comprises means for incrementing said forwarded loopback value.

4. The loopback command system according to claim 1, wherein the forwarded loopback value is represented by a word formed with loopback bits transmitted over said link.

5. The loopback command system according to claim 4, wherein the level of the forwarded loopback value is defined as a function of the magnitude of said word, and further wherein said modifying means modifies said forwarded loopback value by subtracting a smaller word from said word.

6. The loopback command system according to claim 5, wherein said smaller word is 1.

7. The loopback command system according to claim 4, wherein the level of the forwarded loopback value is defined as a function of the magnitude of said word, and further wherein said modifying means modifies said forwarded loopback value by adding a smaller word to said word.

8. The loopback command system according to claim 7, wherein said smaller word is 1.

9. The loopback command system according to claim 1, wherein said bit stream comprises a superframe, each superframe having several frames of channels, each channel having several bits, and further wherein one bit per frame comprises a superframe bit, and another bit per frame comprises a loopback bit, the superframe bit indicating the boundary of a superframe, said loopback command system further comprising:

means for forming a word representing a loopback value with selected ones of respective loopback bits transmitted over several frames, a loopback bit for each frame constituting a particular bit within said word.

10. The loopback command system according to claim 9, wherein the first bit in time of the selected respective loopback bits comprises the most significant bit of said word.

11. The loopback command system according to claim 10, wherein said most significant bit of said word comprises a loopback bit that is transmitted immediately after the indication by said superframe bit of the boundary of a superframe.

12. The loopback command system according to claim 1, wherein the forwarded loopback value is represented by a loopback bit transmitted over said link.

13. The loopback command system according to claim 12, wherein the level of the forwarded loopback value is defined as a function of the position of said loopback bit relative to a position bit, and further wherein said modifying means modifies said forwarded loopback value by shifting the position of said loopback bit relative to the position bit.

14. The loopback command system according to claim 13, wherein said position bit comprises a superframe pulse which corresponds to the beginning of a new superframe within the bit stream of said link.

15. The loopback command system according to claim 12, wherein said modifying means comprises means for shifting the position of said loopback bit by one frame, and said loopback activating means comprises means for activating a loopback of the receiving device when the position of said forwarded loopback bit coincides with the position of the position bit.

16. The loopback command system according to claim 14, wherein said position bit comprises a superframe pulse that corresponds to the beginning of a new superframe within the bit stream of said link.

17. The loopback command system according to claim 12, wherein said modifying means comprises means for shifting the position of said loopback bit within the link's bit stream, and wherein said loopback activating means comprises voting means for determining if said forwarded loopback bit coincides with the position of the position bit for N consecutive occurrences of the position bit within the bit stream of the communications link, and means for activating a loopback of the receiving device when the position of said forwarded loopback bit coincides with the position of the position bit for said N consecutive occurrences.

18. A loopback control method for use in a communications network, the communications network having a first link station connected to a serial digital bit stream communications link, wherein the link traverses several devices as it extends from a first location, at the first link station, to a second location, and further wherein the loopback control method causes a loopback to occur at one or more of the several devices, said method comprising:

transmitting from said first link station an initial loopback value over said link; and at selected ones of said several devices, processing a received loopback value, and, based on the processing, performing one or both of forwarding a processed loopback value to a downstream device and looping back at the device performing the processing, said processing comprising the steps of:

receiving a forwarded loopback value from an upstream device, said forwarded loopback value comprising a modified loopback value when there is an upstream device that performs said processing, said forwarded loopback value otherwise comprising said initial loopback value;

modifying said forwarded loopback value to form a modified loopback value to be transmitted to a downstream device; and activating a loopback of the receiving device when said forwarded loopback value has reached a predetermined level.

19. The method according to claim 18, wherein said modifying, which includes modifying said forwarded loopback value to form a modified loopback value, comprises decrementing said forwarded loopback value.

20. The method according to claim 18, wherein said modifying, which includes modifying said forwarded loopback value to form a modified loopback value, comprises incrementing said forwarded loopback value.

21. The method according to claim 18, wherein said forwarded loopback value is represented by a word formed with loopback bits transmitted over said link.

22. The method according to claim 21, wherein the level of said forwarded loopback value is defined as a function of the magnitude of said word, and further wherein said modifying includes modifying said forwarded loopback value by subtracting a smaller word from said word.

23. The method according to claim 22, wherein said smaller word is 1.

24. The method according to claim 21, wherein the level of said forwarded loopback value is defined as a function of the magnitude of said word, and further wherein said modifying includes modifying said forwarded loopback value by adding a smaller word to said word.

25. The method according to claim 24, wherein said smaller word is 1.

26. The method according to claim 18, wherein said bit stream comprises superframes, each superframe having several frames of channels, each channel having several bits, and further wherein one bit per frame comprises a superframe bit, and another bit per frame comprises a loopback bit, the superframe bit indicating the boundary of a superframe, said method further comprising:

forming a word representing a loopback value with selected ones of respective loopback bits transmitted over several frames, a loopback bit for each frame constituting a particular bit within said word.

27. The method according to claim 26, wherein the first bit in time of the selected respective loopback bits comprises the most significant bit of said word.

28. The method according to claim 27, wherein the most significant bit of said word includes the loopback bit that is transmitted immediately after the indication by said superframe bit of the boundary of a superframe.

29. The method according to claim 18, wherein the forwarded loopback value is represented by a loopback bit transmitted over said link.

30. The method according to claim 29, wherein the level of said forwarded loopback value is defined as a function of the position of said loopback bit relative to a position bit, and further wherein said modifying includes modifying said forwarded loopback value by shifting the position of said loopback bit relative to the position bit.

31. The method according to claim 30, wherein said position bit includes a superframe pulse that corresponds to the beginning of a new superframe within the bit stream of said link.

32. The method according to claim 30, wherein said modifying includes shifting the position of said loopback bit by one frame, and further wherein said loopback activating comprises activating a loopback of the receiving device when the position of said processed loopback bit coincides with the position of the position bit.

33. The method according to claim 32, wherein said position bit comprises a superframe bit that corresponds to the beginning of a new superframe within the bit stream of said link.

34. Apparatus for placement along a transmission link, said apparatus being capable of entering a loopback state upon receipt of a loopback command signal which comprises a loopback value, said apparatus comprising:

means for receiving a forwarded loopback value from a position upstream from said apparatus along a transmission link;

means for modifying said forwarded loopback value to form a modified loopback value;

means for forwarding said modified loopback value in a downstream direction along said transmission link;

means for determining when said forwarded loopback value is equal to a predetermined value; and means for entering said apparatus into a loopback state when said forwarded loopback value is equal to said predetermined value.

35. Apparatus for placement along a transmission link, said apparatus being capable of entering a loopback state upon receipt of a loopback command signal which comprises a loopback value equal to a predetermined value, said apparatus comprising:

means for receiving a forwarded loopback value from a position upstream from said apparatus along a transmission link;

means for modifying said forwarded loopback value to form a modified loopback value;

means for forwarding said modified loopback value in a downstream direction along said transmission link;

means for determining when said modified loopback value is equal to said predetermined value; and means for entering said apparatus into a loopback state when said modified loopback value is equal to said predetermined value.

* * * * *

UNITED STATES PATENT AND TRADEMARK OFFICE
CERTIFICATE OF CORRECTION

PATENT NO. : 5,422,876
DATED : June 6, 1995
INVENTOR(S) : Andy TURUDIC

It is certified that error appears in the above-indentified patent and that said Letters Patent is hereby corrected as shown below:

Title page, item [56], "References Cited", "U.S. PATENT DOCUMENTS", line 4, change "391/20.5" to ---371/20.5---.
    On the cover, in section [56], "References Cited", "U.S. PATENT DOCUMENTS", line 6, change "390/15" to ---370/15---.
    At column 1, line 35, change "America" to ---America,---.
    At column 9, line 28, after "beginning" insert ---of---.
    At column 10, line 12, change "Referring" to ---referring---.
    At column 10, line 39, change "a" to ---A---.
    At column 14, line 64, change "Consecutive" to ---consecutive---.
    At column 15, line 36, after "of" (second occurrence) insert ---all 1's---.

Signed and Sealed this

Seventh Day of May, 1996

Attest:

BRUCE LEHMAN

*Attesting Officer*     *Commissioner of Patents and Trademarks*